(12) United States Patent
Chang et al.

(10) Patent No.: US 10,025,136 B2
(45) Date of Patent: Jul. 17, 2018

(54) TOUCH POLARIZER AND TOUCH DISPLAY DEVICE (71) Applicant: AU OPTRONICS CORPORATION, Hsin-Chu (TW)

(72) Inventors: Chih-Sheng Chang, Hsin-Chu (TW); Sheng-Ming Huang, Hsin-Chu (TW); Sheng-Kai Lin, Hsin-Chu (TW); Wei-Chi Wang, Hsin-Chu (TW); Hui-Ku Chang, Hsin-Chu (TW); Ying-Hui Lai, Hsin-Chu (TW); Han-Sheng Nian, Hsin-Chu (TW); Ming-Jui Wang, Hsin-Chu (TW)

(73) Assignee: AU OPTRONICS CORPORATION, Hsin-chu (TW)

( * ) Notice: Subject to any disclaimer, the term of this patent is extended or adjusted under 35 U.S.C. 154(b) by 149 days.

(21) Appl. No.: 14/950,118

(22) Filed: Nov. 24, 2015

(65) Prior Publication Data
US 2016/0147113 A1 May 26, 2016

(30) Foreign Application Priority Data

Nov. 25, 2014 (TW) .............................. 103140835 A (51) Int. Cl.
G02F 1/1335 (2006.01)
G06F 3/041 (2006.01)
(Continued)

(52) U.S. Cl.
CPC .... *G02F 1/133528* (2013.01); *G02F 1/13338* (2013.01); *G06F 3/044* (2013.01);
(Continued)

(58) Field of Classification Search
None
See application file for complete search history.

(56) References Cited

U.S. PATENT DOCUMENTS

2007/0103061 A1 5/2007 Li
2008/0303798 A1 12/2008 Matsudate et al.
(Continued)

FOREIGN PATENT DOCUMENTS

CN 101853106 A 10/2010
CN 102298466 12/2011
(Continued)

OTHER PUBLICATIONS

Office Action issued in corresponding Taiwan patent application dated Mar. 17, 2016.
(Continued)

*Primary Examiner* — Gustavo Polo
(74) *Attorney, Agent, or Firm* — McClure, Qualey & Rodack, LLP (57) ABSTRACT A touch polarizer and a touch display device are provided. The touch polarizer includes a first substrate, a transparent electrode layer, a wire-grid electrode layer, and a touch circuit. The transparent electrode layer is disposed on the first substrate. The wire-grid electrode layer is disposed on one side of the transparent electrode layer and includes a plurality of wires arranged parallel to each other and spaced to form a wire-grid. The touch circuit respectively connects to the transparent electrode layer and the plurality of wires and generates a touch signal based on a feedback from the transparent electrode layer and the wire-grid electrode layer.

25 Claims, 9 Drawing Sheets (51) Int. Cl.
  *G06F 3/044* (2006.01)
  *G06F 3/047* (2006.01)
  *G02F 1/1333* (2006.01)

(52) U.S. Cl.
  CPC ............ *G06F 3/047* (2013.01); *G06F 3/0416* (2013.01); *G02F 2001/133548* (2013.01); *G06F 2203/04112* (2013.01)

(56) References Cited

U.S. PATENT DOCUMENTS

2009/0322702 A1  12/2009  Chien et al.
2015/0103032 A1* 4/2015  Bell .................. G06F 3/044
                                                345/174

FOREIGN PATENT DOCUMENTS

| CN | 102707515 A | 10/2012 |
| CN | 103336382 | 10/2013 |
| JP | 2013-089150 A | 5/2013 |
| TW | I299239 | 7/2008 |
| TW | 201000966 | 1/2010 |

OTHER PUBLICATIONS

Office Action issued in corresponding China patent application dated Dec. 28, 2016.

* cited by examiner

TOUCH POLARIZER AND TOUCH DISPLAY DEVICE

BACKGROUND OF THE INVENTION

1. Field of the Invention

The present invention relates to a touch polarizer and a touch display device; particularly, the present invention relates to a touch polarizer and a touch display device having an integrated design of touch sensing and polarizing structures.

2. Description of the Prior Art

Polarizer is one of the important components of a display device and can allow light having specific polarization direction from a backlight module to pass therethrough, so that the polarizer has a direct influence on brightness and contrast of the display device. For example, a traditional polarizer allows the vertically polarized light to pass therethrough and absorbs the horizontally polarized light; however, this will block at least half of backlight and result in poor light efficiency problem.

An alternative solution is to dispose a dual brightness enhancement film (DBEF) between the traditional polarizer and the backlight module. For example, by utilizing the structural characteristics of the dual brightness enhancement film, the dual brightness enhancement film allows the vertically polarized light to pass therethrough and to arrive the polarizer and reflects the horizontally polarized light. Light reflected by the dual brightness enhancement film will become unpolarized light during transmission, and then a part of the unpolarized light will pass through the dual brightness enhancement film; thus, the backlight can be utilized repeatedly by the dual brightness enhancement film to increase light passing through the polarizer. However, the production cost will be increased when the dual brightness enhancement film is adopted; besides, this solution will add additional thickness to the display device.

Specifically, for a touch display device using either a single polarizer or the polarizer combining with the dual brightness enhancement film, the touch panel and the display device are independent in structure. In other words, in addition to light efficiency problem mentioned above, when the traditional polarizer structure combines with the touch display device, the thickness of the touch display device is still far from ideal, so that the structure of the traditional display device needs to be improved.

SUMMARY OF THE INVENTION

It is an object of the present invention to provide a touch display device having an integrated structure design to reduce the thickness of a display device.

It is another object of the present invention to provide a touch polarizer to elevate the display transmittance.

The touch polarizer includes a first substrate, a transparent electrode layer, a wire-grid electrode layer, and a touch circuit. The transparent electrode layer is disposed on the first substrate. The wire-grid electrode layer is disposed on one side of the transparent electrode layer. The wire-grid electrode layer includes a plurality of wires arranged parallel to each other and spaced to form a wire-grid. The touch circuit respectively connects to the transparent electrode layer and the plurality of wires and generates a touch signal based on a feedback from the transparent electrode layer and the wire-grid electrode layer.

The touch display device includes a liquid crystal panel, a metal polarizer module, a transparent electrode layer, and a touch circuit. The metal polarizer module has a wire-grid electrode layer, wherein the wire-grid electrode layer includes a plurality of wires arranged parallel to each other and spaced to form a wire-grid. The transparent electrode layer is disposed on one side of the wire-grid electrode layer. The touch circuit respectively connects to the transparent electrode layer and the plurality of wires and generates a touch signal based on a feedback from the transparent electrode layer and the wire-grid electrode layer. By the structural integration design of the metal polarizer module and the transparent electrode layer, the whole thickness of the touch display device can be reduced.

DETAILED DESCRIPTION OF THE PREFERRED EMBODIMENT

The present invention provides a wire-grid type polarizer having multilayer structure in a touch display device. The wire-grid type polarizer includes a plurality of wires which forms a wire-grid and have polarization function. Besides, a touch sensing function is provided by utilizing a touch circuit connected to the plurality of wires and a transparent electrode layer. The structure of combing the wire-grid type polarizer of the present invention with the touch sensing function can reduce the thickness of the touch display device. A display panel of the touch display device preferably includes a liquid crystal panel, or other different kinds of panels required to be used together with a polarizer film.

Figure 1:
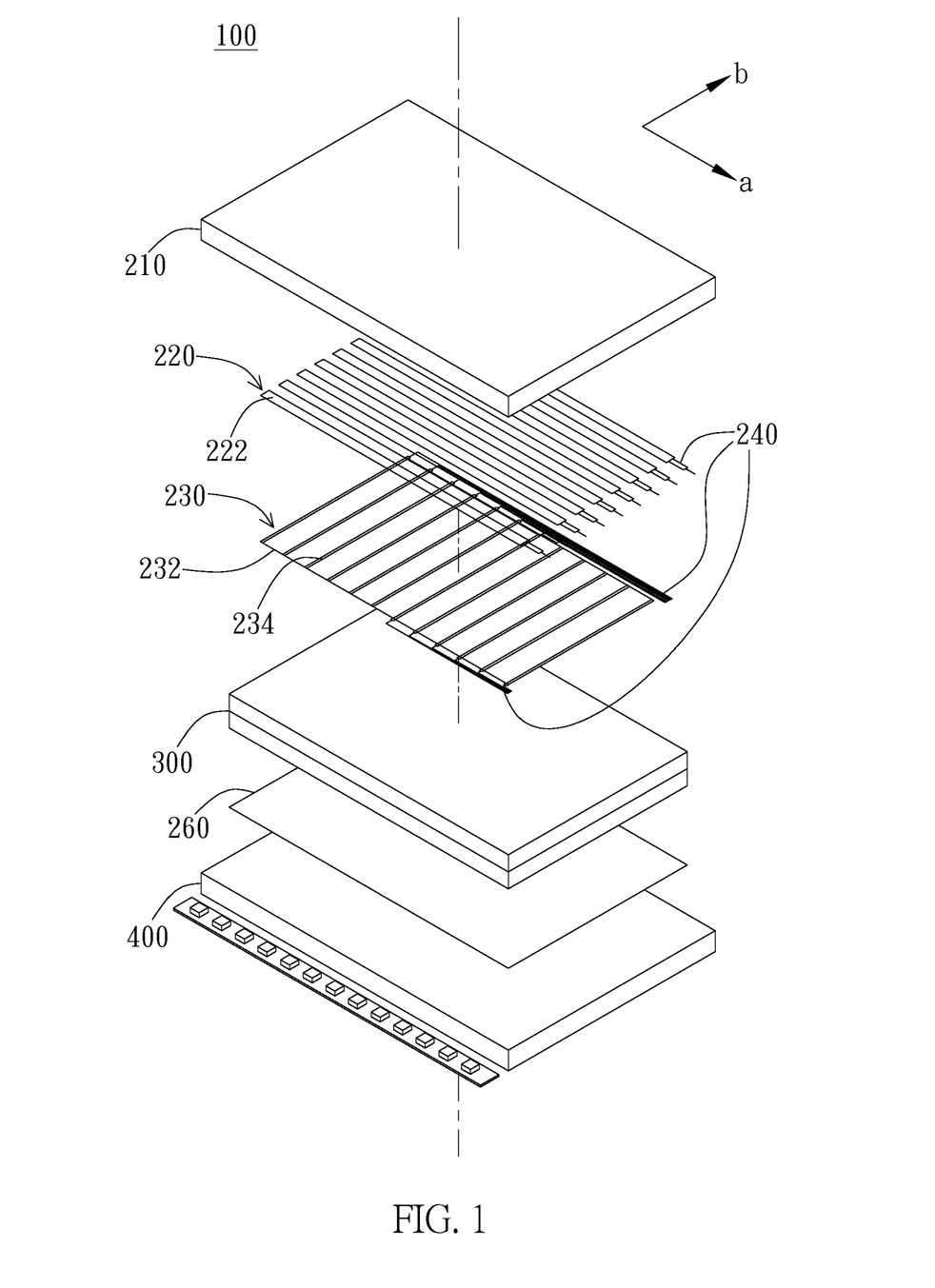
FIG. 1 is an exploded view of the touch display device of the present invention.

FIG. 1 is an exploded view of the touch display device 100 of the present invention. As shown in FIG. 1, the touch display device 100 includes a liquid crystal panel 300, a metal polarizer module 230, a transparent electrode layer 220, and a touch circuit 240. The metal polarizer module 230 is disposed on one side of the liquid crystal panel 300. A backlight module 400 is disposed at the other side of the liquid crystal panel 300 that is opposite to the metal polarizer module 230. In general, the liquid crystal panel 300 is composed of a color filter layer and a thin-film transistor layer. An upper polarizer and a lower polarizer are disposed on the color filter layer and the thin-film transistor layer, respectively. In embodiments of the present invention, the metal polarizer module 230 is disposed above the color filter layer to substitute the upper polarizer. In other embodiments, the lower polarizer 260 may also be substituted for the metal polarizer module 230. The metal polarizer module 230 has a wire-grid electrode layer 232, wherein the wire-grid electrode layer 232 includes a plurality of wires 234 which is arranged parallel to each other and spaced to form a wire-grid. The transparent electrode layer 220 is disposed on the wire-grid electrode layer 232. The transparent electrode layer 220 includes a plurality of transparent electrode strips 222. A first substrate 210 is located at a surface of the transparent electrode layer 220 opposite to the metal polarizer module 230. It is noted that the aforementioned transparent electrode layer 220 is disposed between the first substrate 210 and the wire-grid electrode layer 232, but is not limited thereto. In other embodiments, the locations of the transparent electrode layer 220 and the wire-grid electrode layer 232 may be interchanged, i.e., the wire-grid electrode layer 232 is disposed between the first substrate 210 and the transparent electrode layer 220. The first substrate 210 serves as a substrate for disposing the transparent electrode layer 220 and the wire-grid electrode layer 232, and as a cover lens of the touch display device 100. As shown in FIG. 1, the transparent electrode layer 220 includes the plurality of transparent electrode strips 222 which extends along a first direction (a), and the wire-grid electrode layer 232 includes the plurality of wires 234 which extends along a second direction (b) and are formed on the plurality of transparent electrode strips 222. In other words, the plurality of transparent electrode strips 222 is arranged parallel to each other and spaced along a direction traverse the extension direction of the plurality of wires 234, and the two directions are perpendicular to each other. The transparent electrode layer 220 and the wire-grid electrode layer 232 each has the touch circuit 240 respectively connected to the plurality of transparent electrode strips 222 and the plurality of wires 234. The touch circuit 240 can generate a touch signal based on a feedback from the transparent electrode layer 220 and the wire-grid electrode layer 232. In one embodiment, when user's finger touches the first substrate 210 of the touch display device 100, distribution of electric field lines adjacent to the transparent electrode layer 220 and the wire-grid electrode layer 232 will be changed and the capacitance will be changed correspondingly. The touch circuit 240 can determine the touch position of user's finger and generate the touch signal according to the variation mentioned above.

Figure 2A:
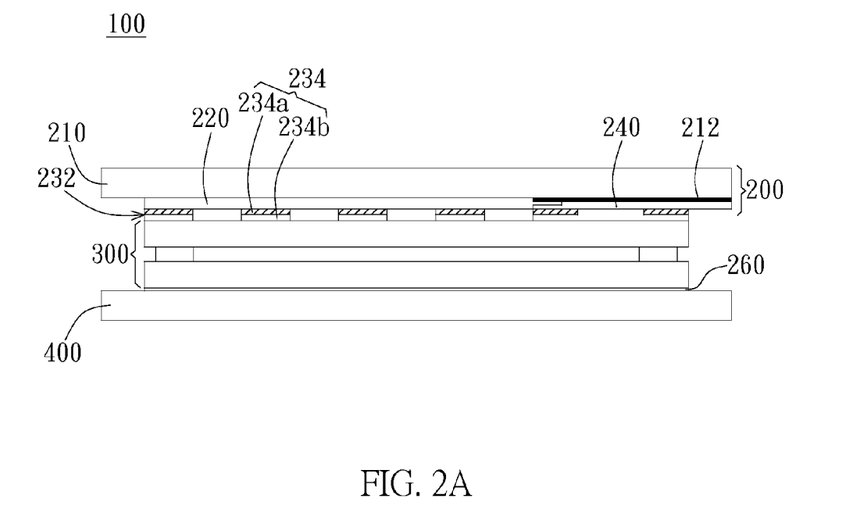
FIG. 2A and FIG. 2B are cross-sectional views of an embodiment of the touch display device of the present invention.
Figure 2B:
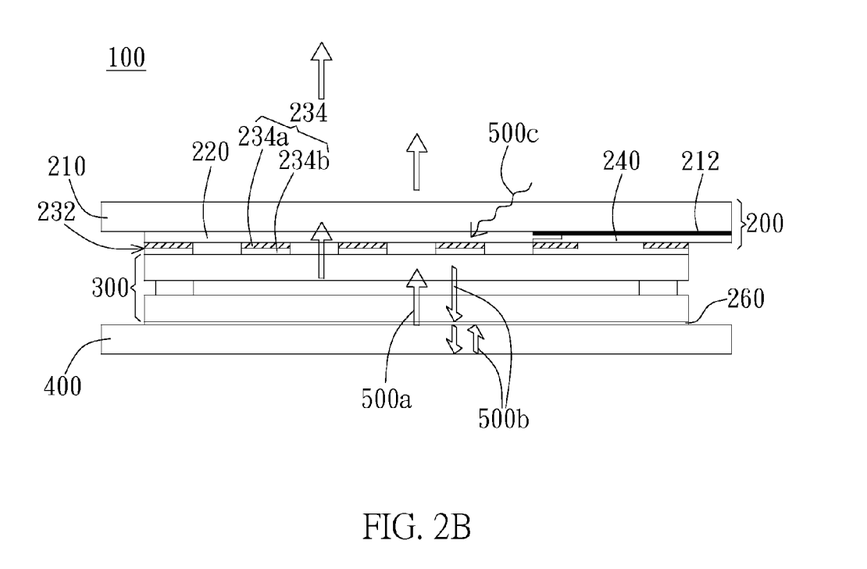

FIG. 2A is a cross-sectional view of an embodiment of the touch display device 100 of the present invention. As shown in FIG. 2A, the transparent electrode layer 220 is disposed on an inner surface of the first substrate 210, and the plurality of wires 234 is located at a surface of the transparent electrode layer 220 opposite to the first substrate 210. That is, the transparent electrode layer 220 disposed between the first substrate 210 and the wire-grid electrode layer 232. The wire 234 preferably has a double-layered structure. Each of the wire 234 includes a first isolation layer 234a and a metal layer 234b. The metal layer 234b is disposed closer to the liquid crystal panel 300 than the first isolation layer 234a is, and the first isolation layer 234a is disposed between the metal layer 234b and the transparent electrode layer 220. Besides, one end of the transparent electrode layer 220 connects the touch circuit 240. A black matrix 212 is disposed between an inner side of the first substrate 210 and the touch circuit 240. As the optical path shown in FIG. 2B, the plurality of wires 234 serves as a wire-grid polarizer, allowing light having specific polarization direction to pass therethrough and preventing reflection of ambient light. For example, light 500a and light 500b represent lights having different polarization directions, and light 500c represents the ambient light. For lights generated from the backlight module 400, light 500a passes through the lower polarizer 260 and then passes through the wire-grid electrode layer 232 via the liquid crystal panel 300. Light 500b does not pass through the lower polarizer 260 and is reflected by the lower polarizer 260. Meanwhile, the first isolation layer 234a of each wire 234 has a much lower reflectivity than the reflectivity of the metal layer 234b, so that the reflectivity of each wire 234 can be reduced and prevents the reflection of ambient light.

Figure 3A:
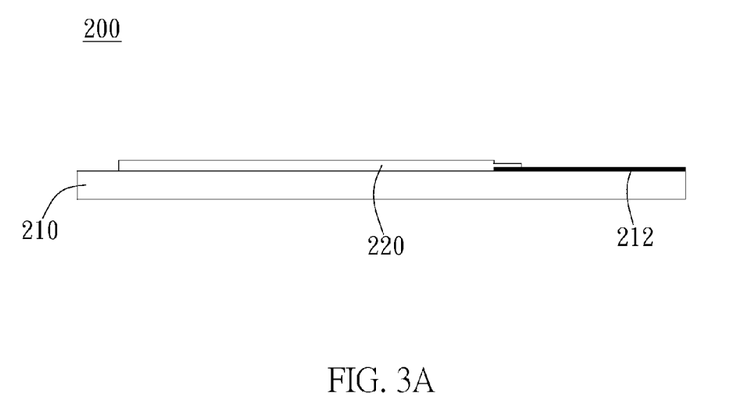
FIG. 3A to FIG. 3E are schematic views of an embodiment of producing the touch polarizer of the touch display device shown in FIG. 2A and FIG. 2B.
Figure 3B:
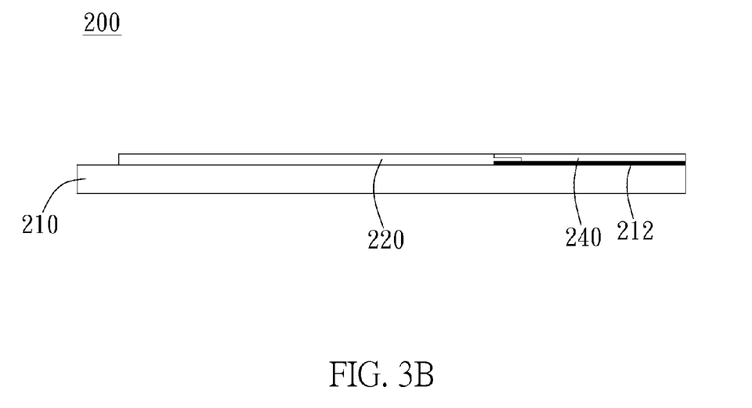
Figure 3C:
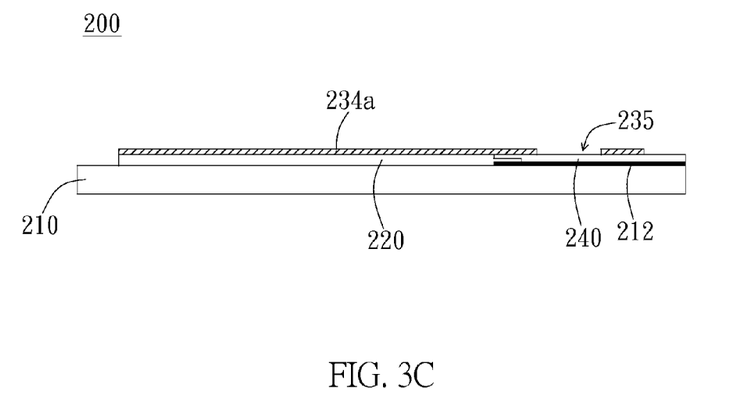
Figure 3D:
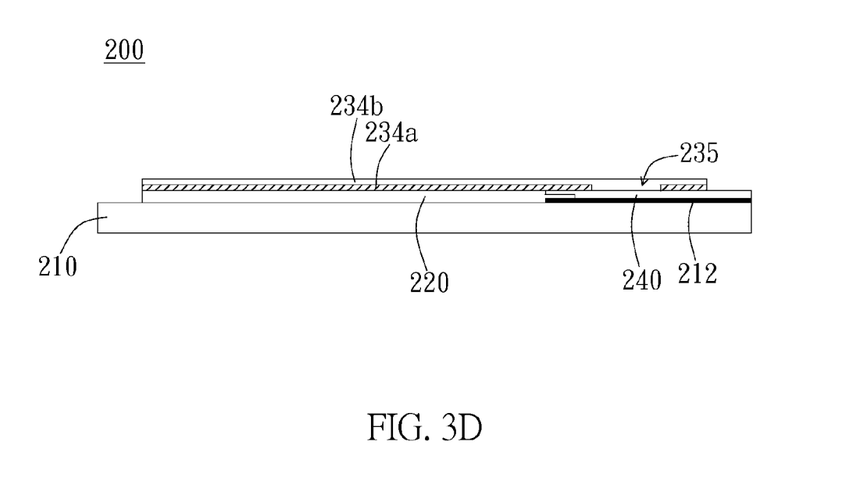
Figure 3E:
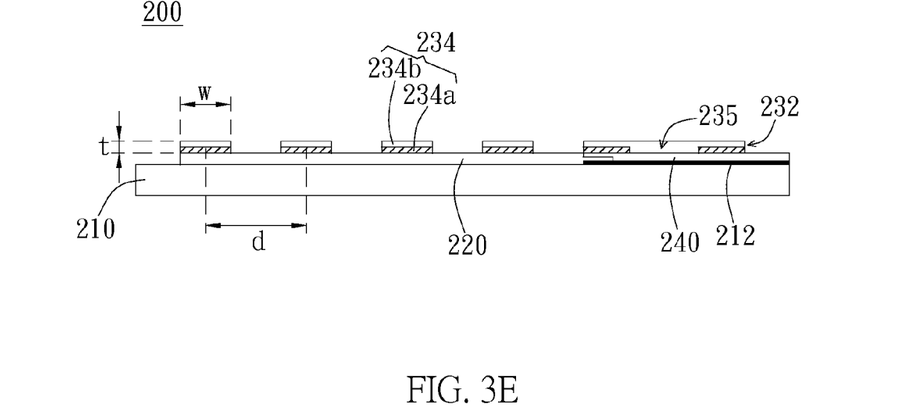

Please further refer to FIG. 3A to FIG. 3E. FIG. 3E is a schematic view of an embodiment of the touch polarizer 200 utilized in the touch display device 100 shown in FIG. 2A and FIG. 2B. As shown in FIG. 3E, the touch polarizer 200 includes the first substrate 210, the transparent electrode layer 220 disposed on the first substrate 210, the wire-grid electrode layer 232 disposed on the transparent electrode layer 220, and the touch circuit 240. Specifically, as the touch polarizer 200 shown in FIG. 3A, the transparent electrode layer 220 is formed on the first substrate 210 by sputtering, and the black matrix 212 is formed at the inner side of the first substrate 210 to prevent light leaking from the non-active area. As shown in FIG. 3B, the touch circuit 240 is formed on the black matrix 212 (i.e. corresponding to the position of the non-active area). After that, as shown in FIG. 3C, the first isolation layer 234a is formed on the transparent electrode layer 220 and serves as an insulation layer. A contact hole 235 for conducting the touch circuit 240 is formed on the first isolation layer 234a corresponding to the position of the black matrix 212. The contact hole 235 can allow the metal layer 234b (referring to FIG. 3D) to connect to the touch circuit 240 from the other side of the first isolation layer 234a. As shown in FIG. 3D, after the first isolation layer 234a is completed, the metal layer 234b is formed on a surface of the first isolation layer 234a. The material of the metal layer 234b can be, for example, aluminum or other conductive metals. The first isolation layer 234a is formed as the insulation layer between the transparent electrode layer 220 and the metal layer 234b. The metal layer 234b can electrically connect the touch circuit 240 via the contact hole 235. It is noted that signals of the transparent electrode layer 220 and the metal layer 234b are derived from different loops by the touch circuit 240. Finally, the plurality of wires 234 is completed by etching the first isolation layer 234a and the metal layer 234b, shown in FIG. 3E.

Alternatively, the transparent electrode layer 220 and the metal layer 234b of the plurality of wires 234 may, depending on the actual circuit design, serve as driving electrodes and sensing electrodes, respectively. For example, the transparent electrode layer 220 serves as the sensing electrodes; the metal layer 234b serves as the driving electrodes, and the touch circuit 240 is utilized to connect to the transparent electrode layer 220 and the metal layer 234b. As such, the touch circuit 240 can generate the touch signal based on the feedback from the transparent electrode layer 220 and the wire-grid electrode layer 232. In addition, the wire-grid electrode layer 232 can provide a function like a polarizer by using the plurality of wires 234 in parallel arrangement to form the wire-grid, which can allow light having specific polarization direction to pass therethrough (referring to FIG. 2B, the wire-grid electrode layer 232 filters out light 500b guided by the liquid crystal panel and allows light 500a to pass the plurality of wires 234). By this design, the polarization function provided by the metal layer 234b can be combined with the touch sensing function provided by the transparent electrode layer 220 and the metal layer 234b, so that the thickness of the touch display device can be reduced. It is noted that the thickness (t) of the plurality of wires 234 mentioned above is preferably between 100 nm and 300 nm to avoid signal interference. In addition, since the metal layer 234b is made of metal and has a low resistance, the metal layer 234b serving as the wire-grid can decrease the driving voltage and save the power consumption.

As to the display effect, the spacing (d) between center points of two adjacent wires spaced is preferably less than or equal to 200 nm centers, and the width (w) of each wire is preferably less than or equal to 100 nm. By this design, the optical character of light having specific polarization direction among the plurality of wires can be controlled; in addition to providing the polarization effect, the optical performance (such as contrast) of the touch display device can be improved. On the other hand, the first isolation layer 234a disposed between the plurality of wires 234 and the transparent electrode layer 220 has the anti-reflective property. For example, a dyed photoresist layer or an anti-reflective insulation layer can be adopted as the first isolation layer 234a to decrease reflection of the ambient light from an outer side of the first substrate 210. Please refer to FIG. 2B, the first isolation layer 234a blocks the ambient light 500c from the outer side of the first substrate 210. As such, the first isolation layer 234a can prevent the reflection of the ambient light on the first substrate 210 that results in pale image color and decreasing display contrast. In other words, in addition to providing the insulation effect between the transparent electrode layer 220 and the metal layer 234b, the first isolation layer 234a can further provide the anti-reflection effect to decrease the influence of ambient light on the display quality of the touch display device. To sum up, the touch polarizer can improve the optical performance by adjusting the distribution period of wires, adjusting the width of each wire, or utilizing the first isolation having anti-reflective property.

Figure 4:
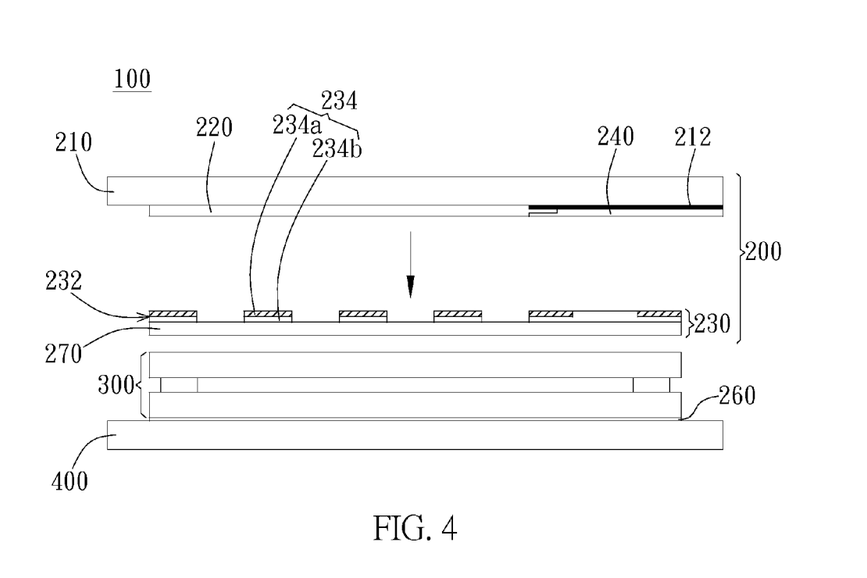
FIG. 4 is a cross-sectional view of a second embodiment of the touch display device of the present invention.

FIG. 4 is a cross-sectional view of another embodiment of the touch display device 100 of the present invention. As shown in FIG. 4, the touch display device 100 further includes a second substrate 270 located between the first substrate 210 and the liquid crystal panel 300. The second substrate 270 may be directly disposed on an outer surface of the liquid crystal panel 300, i.e. the surface facing the first substrate 210. In this embodiment, the wire-grid electrode layer 232 and the transparent electrode layer 220 of the touch polarizer 200 are produced on different substrates. As shown in FIG. 4, the transparent electrode layer 220 is formed on a surface of the first substrate 210 facing the liquid crystal panel 300. The plurality of wires 234 of the wire-grid electrode layer 232 is formed on the second substrate 270 and faces the transparent electrode layer 220. In other words, in the embodiment shown in FIG. 4, in addition to the wire-grid electrode layer 232, the metal polarizer module further includes the second substrate 270. As such, a part of the touch polarizer 200 (i.e. the wire-grid electrode layer 232 and the second substrate 270) combines with the liquid crystal panel 300 at first; the other part of the touch polarizer 200 (i.e. the transparent electrode layer 220 and the first substrate 210) is produced after the first substrate 210 combines with the liquid crystal panel 300 to complete the production of the touch polarizer 200. Generally speaking, a part of the components of the touch polarizer 200 can be produced separately from the first substrate 210. By this design, the efficiency of production process can be promoted.

Figure 5:
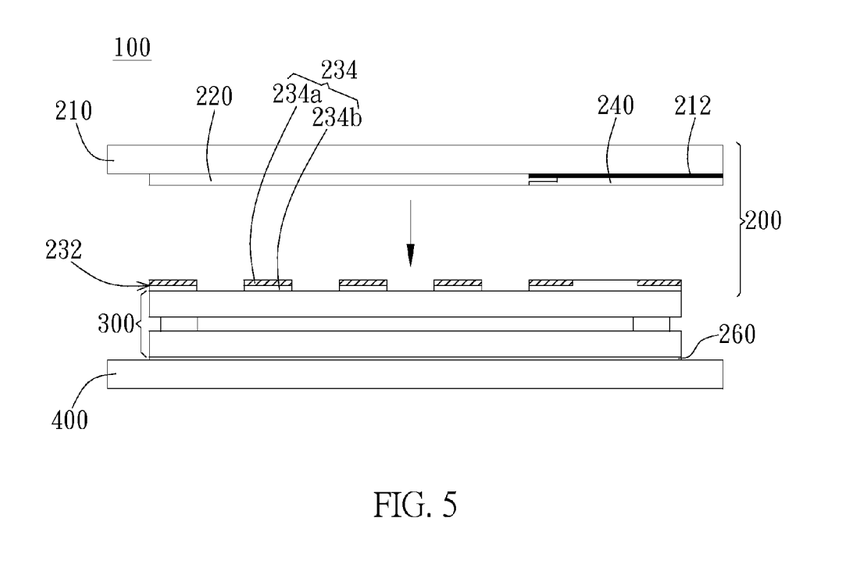
FIG. 5 is a cross-sectional view of a third embodiment of the touch display device of the present invention.

In addition to forming the plurality of wires through the second substrate, the method of producing the wire-grid electrode layer and the transparent electrode layer on different substrates may be adopted by directly forming the plurality of wires of the wire-grid electrode layer on a substrate of the liquid crystal panel. As shown in the cross-sectional view of FIG. 5, the plurality of wires 234 of the wire-grid electrode layer 232 is directly formed on the liquid crystal panel 300 and faces the first substrate 210. Then the first substrate 210 is combined with the liquid crystal panel 300 to complete the production of the touch display device 100. Utilizing the integral forming design of the metal polarizer module and the liquid crystal panel, the efficiency of the production process can thereby be promoted.

Figure 6A:
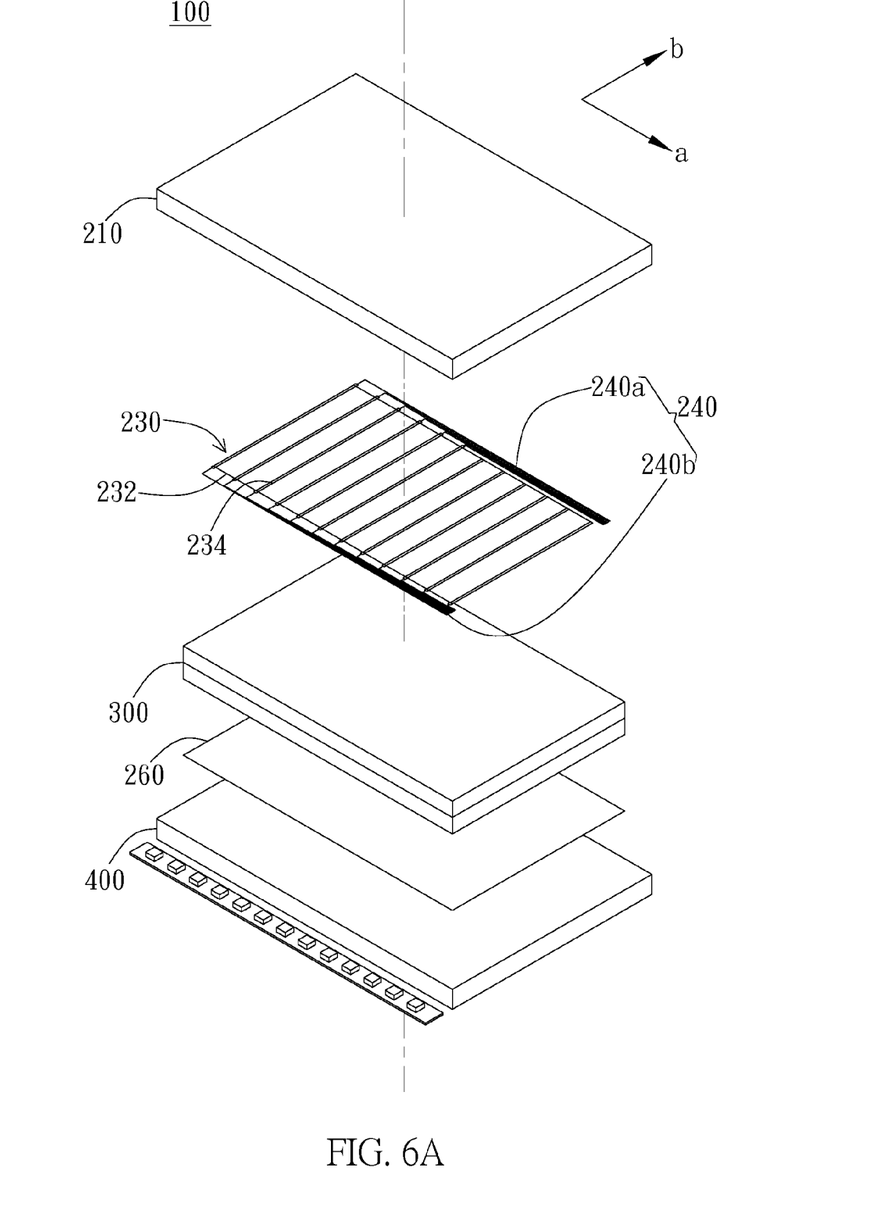
FIG. 6A and FIG. 6B are cross-sectional views of a fourth embodiment of the touch display device of the present invention.
Figure 6B:
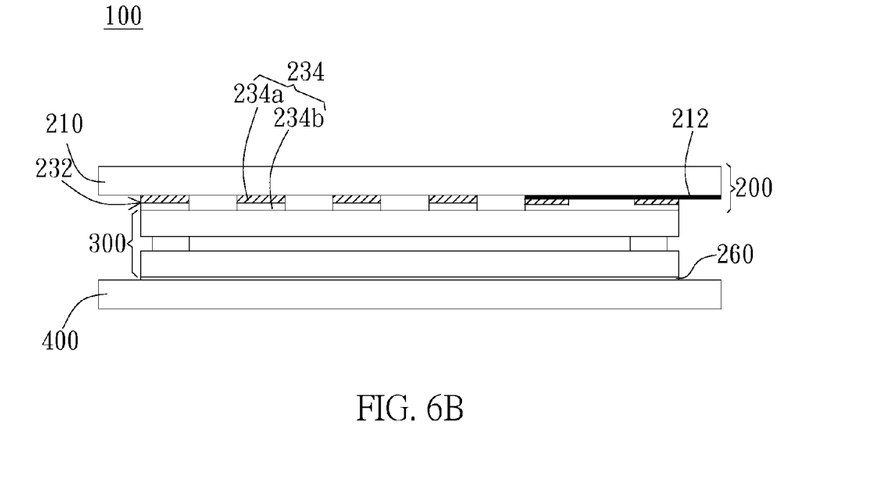

FIG. 6A and FIG. 6B are cross-sectional views of a fourth embodiment of the touch display device of the present invention. As shown in FIG. 6A, compared to the aforementioned embodiments using the double-layered touch structure composed by the transparent electrode layer 220 and the wire-grid electrode layer 232, the wire-grid electrode layer 232 of the touch display device 100 shown in FIG. 6A forms a single-layer touch structure. As shown in FIG. 6A, the metal polarizer module 230 has the wire-grid electrode layer 232. The touch circuit 240 generates a touch signal based on different feedback outputted from different wires of the metal polarizer module 230. For example, the feedback signal coming from sensing electrodes in the wire-grid electrode layer 232 is outputted through the touch circuit 240a; the feedback signal coming from driving electrodes in the wire-grid electrode layer 232 is outputted through the touch circuit 240b. Please refer to FIG. 6b; since the touch display device 100 forms the single-layered touch structure, the touch polarizer 200 includes the first substrate 210, the wire-grid electrode layer 232, and the touch circuit 240, but does not include the aforementioned transparent electrode layer. The plurality of wires 234 of the wire-grid electrode layer 232 has a double-layered structure, wherein the metal layer 234b is closer to the liquid crystal panel 300 than the first isolation layer 234a is, and the first isolation layer 234a is disposed between the metal layer 234b and the transparent electrode layer 220. By this design, the touch function can be merged into the production process of the wire-grid electrode layer to simplify the production process.

Figure 7:
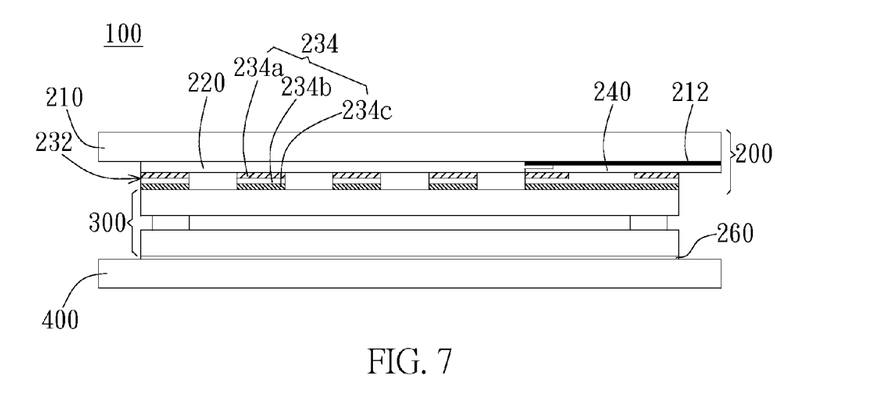
FIG. 7 is a cross-sectional view of a fifth embodiment of the touch display device of the present invention.

FIG. 7 is a cross-sectional view of another embodiment of the touch display device 100 of the present invention. As shown in FIG. 7, the transparent electrode layer 220 is disposed on an inner surface of the first substrate 210. The plurality of wires 234 is located at a surface of the transparent electrode layer 220 opposite to the first substrate 210. The difference from the aforementioned embodiments is that the plurality of wires 234 shown in FIG. 7 has a triple-layered structure. In addition to the first isolation layer 234a and the metal layer 234b mentioned above, each wire 234 further includes a second isolation layer 234c. As shown in FIG. 7, the first isolation layer 234a is disposed between the metal layer 234b and the transparent electrode layer 220; the second isolation layer 234c is disposed between the metal layer 234b and the liquid crystal panel 300. In other words, the metal layer 234b is disposed between the second isolation layer 234c and the first isolation layer 234a.

Figure 8A:
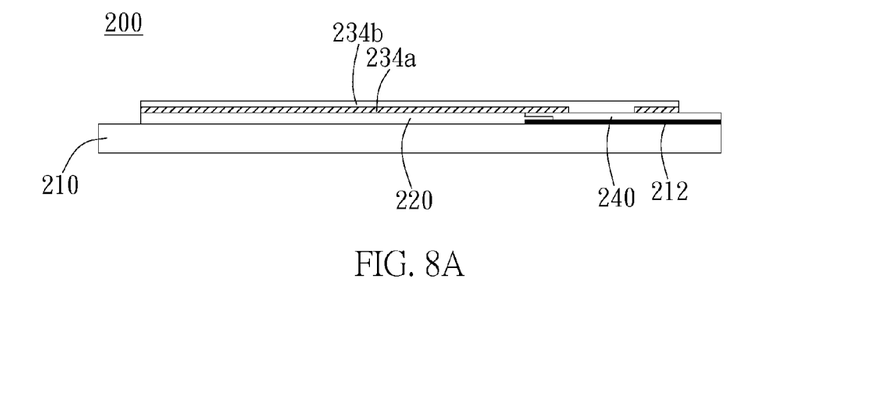
FIG. 8A to FIG. 8D are schematic views of an embodiment of producing the touch polarizer of the touch display device shown in FIG. 7.
Figure 8B:
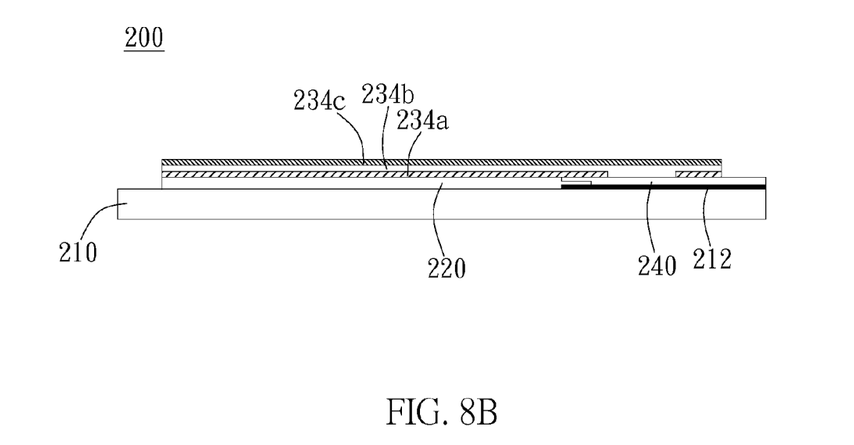
Figure 8C:
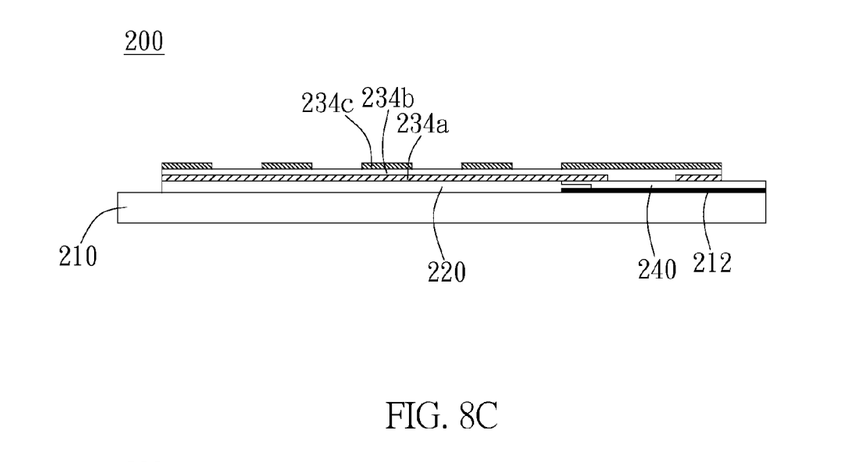
Figure 8D:
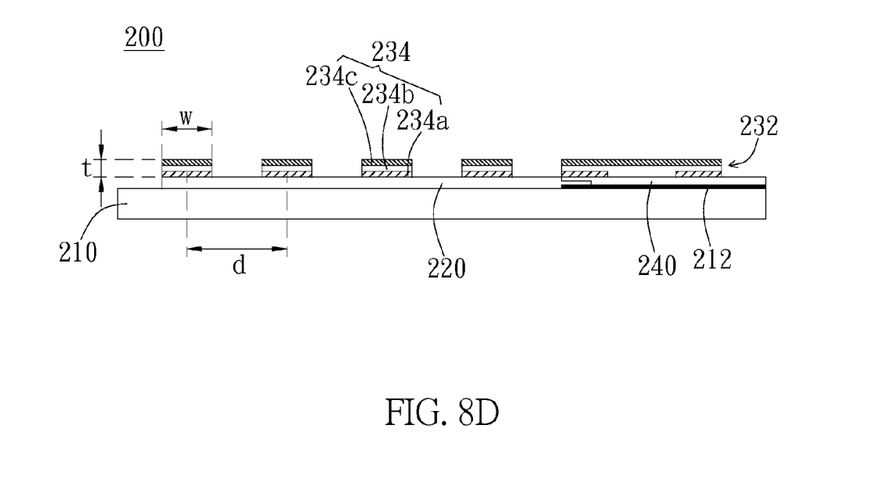

Please further refer to FIG. 8A to FIG. 8D. FIG. 8D is a schematic view of an embodiment of the touch polarizer 200 utilized in the touch display device 100 shown in FIG. 7. As shown in FIG. 8D, the touch polarizer 200 includes the first substrate 210, the transparent electrode layer 220 disposed on the first substrate 210, the wire-grid electrode layer 232 disposed on the transparent electrode layer 220, and the touch circuit 240. As shown in FIG. 8A, according to the production process mentioned above, the transparent electrode layer 220, the black matrix 212, the touch circuit 240, the first isolation layer 234a, and the metal layer 234b are sequentially formed. As shown in FIG. 8B, the second isolation layer 234c is formed on the metal layer 234b by spin coating. Next, as shown in FIG. 8C, the second isolation layer 234c is etched. Finally, as shown in FIG. 8D, the first isolation layer 234a and the metal layer 234b are etched to complete the plurality of wires 234.

In order to meet structural requirement mentioned above, the first isolation layer 234a and the second isolation layer 234c preferably adopt material capable of providing high aspect ratio, such as resin type photoresist or siloxane type photoresist. Specifically, a ratio of etching rate of the second isolation layer 234c to the first isolation layer 234a for a predetermined etchant is smaller than 0.8:1, wherein the first isolation layer 234a may be the resin type photoresist, the second isolation layer 234c may be the siloxane type photoresist, and the predetermined etchant may be oxygen plasma. In other words, in the case of using oxygen plasma as the predetermined etchant, the plurality of wires may select an etch-resist material as the second isolation layer 234c, and select materials having weak etching performance (i.e. easy to etch) as the first isolation layer 234a. In a preferred embodiment, the ratio of etching rate of the second isolation layer 234c to the first isolation layer 234a for a predetermined etchant is smaller than 1:20. As such, after etching process, the first isolation layer 234a can have a larger thickness than the thickness of the second isolation layer 234c, and is suitable for the insulation layer between the transparent electrode layer 220 and the metal layer 234b. As mentioned above, the thickness (t) of the plurality of wires is preferably between 100 nm and 300 nm to avoid signal interference and can bring advantage of decreasing the driving voltage and saving power consumption. Besides, the thickness of the metal layer 234b is preferably greater than or equal to 50 nm to ensure that each wire, after being etched, can avoid signal interference.

As to the display effect, at least one of the first isolation layer 234a and the second isolation layer 234c has anti-reflective property, or the first isolation layer 234a and the second isolation layer 234c both have anti-reflective property to form an anti-reflective means. For example, a dyed photoresist layer or an anti-reflective insulation layer can be adopted as the first isolation layer 234a and the second isolation layer 234c. As mentioned above, adopting the first isolation layer 234a having anti-reflective property can decrease reflection of the ambient light from the outer side of the first substrate 210 and avoid the ambient light influencing the display effect (such as contrast). On the other hand, adopting the second isolation layer 234c having anti-reflective property can decrease the reflection intensity of a part of internal light (such as light coming from the backlight module) that does not pass through the plurality of wires. Specifically, the second isolation layer 234c is a low reflectivity material to cause the reflectivity of each of the wires to be preferably lower than 10%. The touch display device can thereby prevent the part of internal light that does not pass through and reflected by the plurality of wires from influencing the display effect (such as contrast). In other words, in addition to utilizing the first isolation layer 234a having anti-reflective property to decrease external ambient light influencing the display effect, the second isolation layer 234c can be utilized to decrease internal light influencing the display effect, and the image quality of the touch display device can thereby be improved. Besides, the improvement on the optical performance (such as contrast) of the touch display device, for example, by the spacing (d) of center points of two adjacent wires and the width (w) of each wire has mentioned above and does not elaborate hereinafter.

Figure 9:
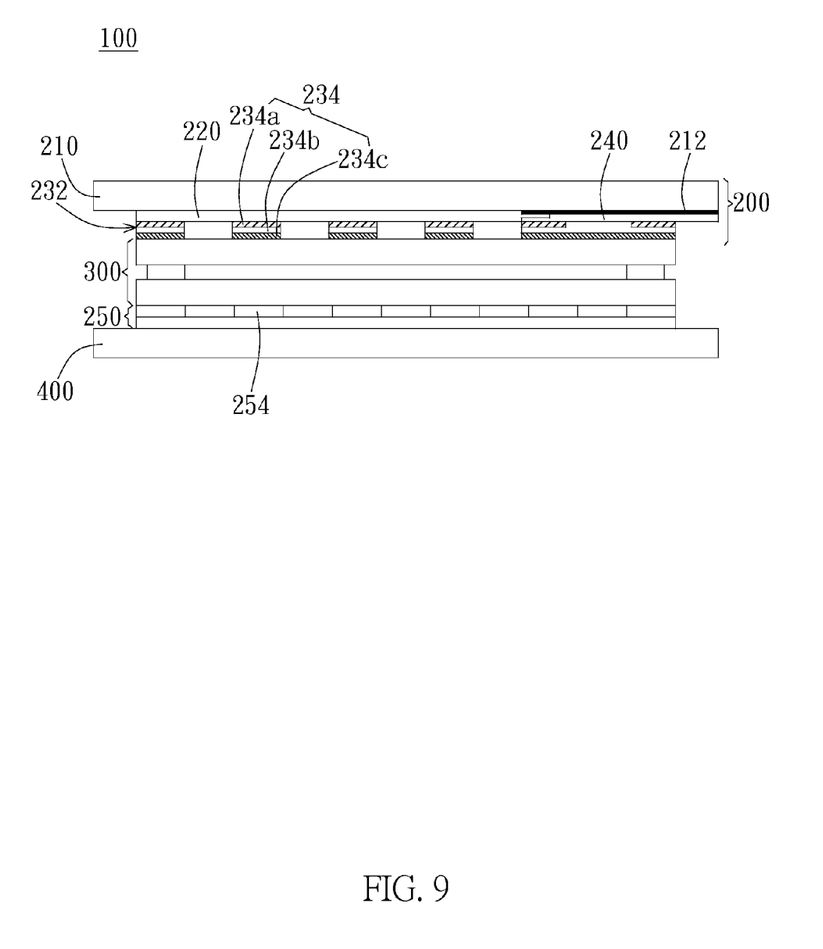
FIG. 9 is a cross-sectional view of a sixth embodiment of the touch display device of the present invention.

FIG. 9 is a cross-sectional view of another embodiment of the touch display device 100 of the present invention. As shown in FIG. 9, the transparent electrode layer 220 is disposed on the inner surface of the first substrate 210. The plurality of wires 234 is located at the surface of the transparent electrode layer 220 opposite to the first substrate 210. The difference from the aforementioned embodiments is that the metal polarizer module 230 and the metal polarizer module 250 are disposed on two opposite surfaces of the liquid crystal panel 300, respectively. The metal polarizer module 230 is to substitute the upper polarizer, and the metal polarizer module 250 is to substitute the lower polarizer. The metal polarizer module 250 includes the plurality of transparent electrode strips 222 arranged parallel to each other and spaced to form a wire-grid. Utilizing the metal polarizer module 250 can provide functions of the lower polarizer in a traditional touch display device and can further reflect the reflected internal light back to the liquid crystal panel 300 to increase light recovery rate.

By utilizing the touch polarizer and the touch display device of the present invention, the polarization function can combine with the touch sensing function, and the thickness of the touch display device can be decreased. Besides, the optical performance of the touch display device can be improved by adjusting distribution period of the wires and the width of each wire. In addition, for the metal polarizer module serving as the upper polarizer, adopting the first isolation layer and the second isolation layer having anti-reflective property can decrease reflection of ambient light and internal light of the touch display device, so that the optical performance can be improved.

Although the preferred embodiments of the present invention have been described herein, the above description is merely illustrative. Further modification of the invention herein disclosed will occur to those skilled in the respective arts and all such modifications are deemed to be within the scope of the invention as defined by the appended claims.

What is claimed is:

1. A touch polarizer, comprising:
    a first substrate;
    a wire-grid electrode layer disposed on the first substrate, the wire-grid electrode layer comprising a plurality of wires arranged parallel to each other and spaced to form a wire-grid, the plurality of wires allowing light having specific polarization direction to pass therethrough, wherein each of the wires comprises a first isolation layer, a second isolation layer, and a metal layer; the first isolation layer is disposed between the metal layer and a transparent electrode layer; the metal layer is disposed between the second isolation layer and the first isolation layer; and
    a touch circuit connected to the plurality of wires, the touch circuit generating a touch signal based on a feedback from the wire-grid electrode layer.

2. The touch polarizer of claim 1, wherein the transparent electrode layer is disposed between the first substrate and the wire-grid electrode layer, the touch circuit connecting the transparent electrode layer and generating the touch signal based on a feedback from the transparent electrode layer.

3. The touch polarizer of claim 1, wherein at least one of the first isolation layer and the second isolation layer has anti-reflective property.

4. The touch polarizer of claim 1, wherein a ratio of etching rate of the second isolation layer to the first isolation layer for a predetermined etchant is smaller than 0.8:1.

5. The touch polarizer of claim 2, wherein a reflectivity of each of the wires is lower than 10%.

6. The touch polarizer of claim 2, wherein a thickness of the metal layer is greater than or equal to 50 nm.

7. The touch polarizer of claim 1, wherein two adjacent wires spaced is less than or equal to 200 nm centers.

8. The touch polarizer of claim 7, wherein a width of each wire is less than or equal to 100 nm.

9. The touch polarizer of claim 1, wherein a transparent electrode layer comprises a plurality of transparent electrode strips, and the plurality of transparent electrode strips is arranged perpendicular to the plurality of wires.

10. The touch polarizer of claim 1, wherein the thickness of the plurality of wires is between 100 nm and 300 nm.

11. The touch polarizer of claim 1, wherein a transparent electrode layer comprises a plurality of transparent electrode strips arranged parallel to each other and spaced along a direction across the plurality of wires.

12. A touch display device, comprising:
a liquid crystal panel;
at least one metal polarizer module disposed on one side of the liquid crystal panel, the metal polarizer module having a wire-grid electrode layer comprising a plurality of wires arranged parallel to each other and spaced to form a wire-grid, wherein each of the wires comprises a first isolation layer, a second isolation layer, and a metal layer; the metal layer is disposed between the second isolation layer and the first isolation layer;
a transparent electrode layer disposed on the wire-grid electrode layer, wherein the first isolation layer is disposed between the metal layer and the transparent electrode layer; and
a touch circuit respectively connected to the transparent electrode layer and the plurality of wires and generating a touch signal based on a feedback from the transparent electrode layer and the wire-grid electrode layer.

13. The touch display device of claim 12, wherein the touch display device comprises two metal polarizer modules disposed on two opposite surfaces of the liquid crystal panel.

14. The touch display device of claim 12, further comprising a first substrate, the transparent electrode layer being formed on a surface of the first substrate facing the liquid crystal panel, the plurality of wires of the wire-grid electrode layer being formed on the liquid crystal panel facing the transparent electrode layer.

15. The touch display device of claim 12, further comprising:
a first substrate; and
a second substrate directly disposed on an outer surface of the liquid crystal panel and located between the first substrate and the liquid crystal panel;
wherein the transparent electrode layer is formed on a surface of the first substrate facing the liquid crystal panel, the plurality of wires of the wire-grid electrode layer is formed on the second substrate and facing the transparent electrode layer.

16. The touch display device of claim 12, wherein at least one of the first isolation layer and the second isolation layer has anti-reflective property.

17. The touch display device of claim 12, wherein a ratio of etching rate of the second isolation layer to the first isolation layer for a predetermined etchant is smaller than 1:20.

18. The touch display device of claim 12, wherein a reflectivity of each of the wires is lower than 10%.

19. The touch display device of claim 12, wherein a thickness of the metal layer is greater than or equal to 50 nm.

20. The touch display device of claim 12, wherein two adjacent wires spaced is less than or equal to 200 nm centers.

21. The touch display device of claim 20, wherein a width of each wire is less than or equal to 100 nm.

22. The touch display device of claim 12, wherein the plurality of wires are arranged perpendicular to the plurality of transparent electrode strips.

23. The touch display device of claim 12, wherein the thickness of the plurality of wires is between 100 nm and 300 nm.

24. The touch display device of claim 12, wherein the transparent electrode layer comprises a plurality of transparent electrode strips arranged parallel to each other and spaced along a direction across the plurality of wires.

25. A touch display device, comprising:
a liquid crystal panel;
at least one metal polarizer module disposed on one side of the liquid crystal panel, the metal polarizer module having a wire-grid electrode layer comprising a plurality of wires arranged parallel to each other and spaced to form a wire-grid, the plurality of wires allowing light having specific polarization direction to pass therethrough;
a transparent electrode layer disposed on the wire-grid electrode layer; and
a touch circuit respectively connected to the transparent electrode layer and the plurality of wires and generating a touch signal based on a feedback from the transparent electrode layer and the wire-grid electrode layer,
wherein each of the wires comprises a first isolation layer and a metal layer; the first isolation layer is disposed between the metal layer and the transparent electrode layer, the reflectivity of the first isolation layer of each wire is lower than the reflectivity of the metal layer of each wire.

* * * * *